(12) United States Patent
Do et al.

(10) Patent No.: US 11,496,529 B2
(45) Date of Patent: Nov. 8, 2022

(54) METHOD AND DEVICE FOR PROVIDING MULTIMEDIA SERVICE IN ELECTRONIC DEVICE

(71) Applicant: Samsung Electronics Co., Ltd., Suwon-si (KR)

(72) Inventors: Taewon Do, Suwon-si (KR); Yongtae Kim, Suwon-si (KR); Hyeyoung Jun, Suwon-si (KR); Hoonjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/251,957

(22) PCT Filed: Jul. 2, 2019

(86) PCT No.: PCT/KR2019/008029
§ 371 (c)(1),
(2) Date: Dec. 14, 2020

(87) PCT Pub. No.: WO2020/009417
PCT Pub. Date: Jan. 9, 2020

(65) Prior Publication Data
US 2021/0250387 A1   Aug. 12, 2021

(30) Foreign Application Priority Data

Jul. 5, 2018   (KR) .......................... 10-2018-0078405

(51) Int. Cl.
*G06F 15/16*   (2006.01)
*H04L 65/1069*   (2022.01)
(Continued)

(52) U.S. Cl.
CPC .......... *H04L 65/1069* (2013.01); *H04L 65/80* (2013.01); *H04N 7/147* (2013.01); *H04W 80/08* (2013.01)

(58) Field of Classification Search
CPC ............... H04L 65/608; H04L 65/1016; H04L 65/1069; H04L 69/24; H04W 80/10; H04W 4/02
See application file for complete search history.

(56) References Cited

U.S. PATENT DOCUMENTS 7,953,867 B1 * 5/2011 Andreasen ............... H04L 69/24
709/227
2002/0165966 A1   11/2002 Widegren et al.
(Continued)

FOREIGN PATENT DOCUMENTS

CN   1623308 A   6/2005
CN   101406086 A   4/2009
(Continued)

OTHER PUBLICATIONS

3GPP; TSG SA; IP Multimedia Subsystem (IMS); Multimedia Telephony; Media handling and interaction (Release 15), 3GPP TS 26.114 V15.3.0, Jun. 22, 2018 section 6.2, 7.3.1, 7.3.6, 9.3.1; Jun. 22, 2018.
(Continued)

*Primary Examiner* — Dustin Nguyen
(74) *Attorney, Agent, or Firm* — Jefferson IP Law, LLP

(57) ABSTRACT

Various embodiments of the present invention disclose a method and device for an electronic device to provide a multimedia service in an IMS network environment. According to various embodiments of the present invention, an electronic device includes: a wireless communication module; a processor operatively connected with the wireless communication module; and a memory operatively connected with the processor, wherein the memory may store
(Continued)

instructions which, when executed, cause the processor to: establish a session for a media service with a counterpart electronic device by using the communication module; transmit a packet including a first message related to the use of a quality service to the counterpart electronic device after the session is established; determine whether the counterpart electronic device can use the quality service on the basis of a second message in a packet received from the counterpart electronic device; enable at least one quality improvement function on the basis of the second message if the counterpart electronic device can use the quality service; and while the media service is being performed, transmit to the counterpart electronic device, a packet having improved quality on the basis of the quality improvement function. Various other embodiments are also possible.

13 Claims, 10 Drawing Sheets

(51) Int. Cl.
  *H04L 65/80* (2022.01)
  *H04N 7/14* (2006.01)
  *H04W 80/08* (2009.01)

(56) References Cited

U.S. PATENT DOCUMENTS

| | | | |
|---|---|---|---|
| 2004/0139088 A1 | 7/2004 | Dato et al. | |
| 2005/0091190 A1 | 4/2005 | Klemets | |
| 2005/0157660 A1 | 7/2005 | Mandato et al. | |
| 2006/0234745 A1 | 10/2006 | Park et al. | |
| 2007/0286117 A1 | 12/2007 | Balasubramanian et al. | |
| 2008/0291930 A1 | 11/2008 | Damola et al. | |
| 2009/0021572 A1 | 1/2009 | Garudadri et al. | |
| 2012/0106451 A1* | 5/2012 | Enstrom | H04L 65/1069 370/328 |
| 2014/0036048 A1* | 2/2014 | Furbeck | H04W 4/02 348/61 |
| 2014/0314080 A1 | 10/2014 | Park et al. | |
| 2016/0105468 A1* | 4/2016 | Mufti | H04L 65/1069 709/228 |
| 2017/0013084 A1* | 1/2017 | Whynot | H04L 65/1016 |
| 2017/0054770 A1* | 2/2017 | Wells | H04L 65/608 |
| 2017/0055184 A1 | 2/2017 | Hajj-Ahmad et al. | |
| 2019/0215729 A1* | 7/2019 | Oyman | H04W 80/10 |

FOREIGN PATENT DOCUMENTS

| | | |
|---|---|---|
| EP | 1676216 A1 | 7/2006 |
| KR | 10-2906-0102054 A | 9/2006 |
| KR | 10-2009-0108079 A | 10/2009 |
| KR | 10-2015-0144322 A | 12/2015 |
| WO | 2005/045704 A1 | 5/2005 |

OTHER PUBLICATIONS

Extended European Search Report dated Mar. 29, 2021, issued in a counterpart European Application No. 19831020.3-1213.
"3rd Generation Partnership Project; Technical Specification Group Services and System Aspects; IP Multimedia Subsystem (IMS); Stage 2 (Release 15)", 3GPP Standard; Technical Specification; 3GPP TS 23.228, 3rd Generation Partnership Project (3GPP), Mobile Competence Centre; 650, Route Des Lucioles ; F-06921 Sophia-Antipolis Cedex ; France, vol. SA WG2, No. V15.2.0, Mar. 27, 2018, pp. 1-330, XP051450517.
"3rd Generation Partnership Project, Technical Specification Group Services and System Aspects; IP Multimedia Subsystem (IMS); Multimedia Telephony; Media handling and interaction (Release 15)", 3GPP Standard Technical Specification; 3GPP TS 26.114, 3rd Generation Partnership Project (3GPP), Mobile Competence Centre; 650, Route Des Lucioles ; F-06921 Sophia-Antipolis Cedex ; France, vol. SA WG4, No. 15.3.0, Jun. 22, 2018, pp. 1-399.
Ott Helsinki Unviversity of Technology S Wenger Nokia NSA to Oki C Burmeister J Rey Matsushita J: "Extended RTP Profile for Real-time Transport Control Protocol (RTCP)-Based Feedback (RTP/AVPF); rfc4585.txt", Extended RTP Profile for Real-Time Transport Control Protocol (RTCP)?-Based Feedback (RTP/AVPF)?; RFC4585. TXT, Internet Engineering Task Force, IETF; Standard Internet Society (ISOC) 4, Rue Des Falaises CH-1205 Geneva, Switzerland, Jul. 1, 2006, pp. 1-51.
Schulzrinne Columbia University S Casner Packet Design R Frederick Blue Coat Systems Inc V Jacobson Packet Design H: "RTP: A Transport Protocol for Real-Time Applications; rfc3550.txt", RTP: A Transport Protocol for Real-Time Applications; RFC3550. TXT, Internet Engineering Task-Orce, IETF; Standard, Internet Society (ISOC) 4, Rue Des Falaises CH-1205 Geneva, Switzerland, Jul. 1, 2003, XP015009332.
Chinese Office Action with English translation dated Sep. 20, 2022; Chinese Appln. No. 201980045220.7.

* cited by examiner

FIG. 5A

| 0                   | 1                   | 2                   | 3     |
|---------------------|---------------------|---------------------|-------|
| 0 1 2 3 4 5 6 7 8 9 | 0 1 2 3 4 5 6 7 8 9 | 0 1 2 3 4 5 6 7 8 9 | 0 1   |

| V=2 \| P \| SC | PT=SDES=202 | length |
|---|---|---|
| SSRC/ CSRC_1 | | |
| SDES items | | |
| SDES ITEMS IDENTIFICATION INFORMATION | | |

METHOD AND DEVICE FOR PROVIDING MULTIMEDIA SERVICE IN ELECTRONIC DEVICE

TECHNICAL FIELD

Various embodiments disclose a method and device for providing multimedia services (e.g., video calls and/or voice calls) by an electronic device in an Internet protocol (IP) multimedia subsystem (IMS) network environment.

BACKGROUND ART

The Internet protocol (IP) multimedia subsystem (IMS) is a subsystem for providing multimedia services on the basis of Internet protocol (IP), and may provide various multimedia services, such as voice, audio, video, and data.

When multimedia services (e.g., video calls and/or voice calls) are provided in an IMS network environment, an electronic device may perform a negotiation operation for establishing (or forming) a session with a counterpart electronic device. The electronic device may determine a parameter (hereinafter, referred to as a "QoS parameter") for controlling the quality of service (QoS) of the multimedia services during the negotiation operation, and may provide the multimedia services on the basis of the determined QoS parameter. The QoS parameter is defined by a real-time transport control protocol (RTCP) that is a protocol for maintaining QoS of a real-time transport protocol (RTP).

RTCP indicates an out-of-band control protocol, and may enable RTP entities to monitor data delivery and to have a minimum control function. The purpose of RTCP may include, for example, (1) feedback of end-to-end network quality, (2) carriers of canonical name to associate multiple data streams (CNAME), (3) bitrate control of an RTCP packet, and (4) minimal session control information. Types of the RTCP packet may include, for example, a sender report (SR), a receiver report (RR), SDES for CNAME, BYE, an APP packet, and the like. Detailed descriptions of RTCP are described in the RTCP standard, so as to be omitted.

In order to improve the quality of multimedia services (e.g., video calls) in the IMS network environment, QoS techniques (e.g., packet loss recovery technology, intra frame request technology, etc.) based on RTCP feedback (e.g., NACK feedback) may be used.

DISCLOSURE OF INVENTION

Technical Problem

In order to improve the quality of multimedia services (e.g., IMS-based video calls), an electronic device may perform a negotiation operation for session establishment by turning on (or activating) audio-visual profile feedback (AVPF). However, some countries regulate, for negotiation, AVPF to be off (or disable) during negotiation for session establishment. Therefore, in some countries, quality of service (QoS) technologies may not be available due to negotiation performed based on AVPF-Off. For example, in a real-time IMS-based video call, if negotiation is performed based on AVPF-Off, QoS technique between electronic devices cannot be enabled, so that the quality of calls may deteriorate when a packet loss, etc. occurs.

In various embodiments, a method and device for improving the quality of a multimedia service (e.g., a video/audio call) via an Internet protocol (IP) multimedia subsystem (IMS) network is disclosed.

In various embodiments, a method and device capable of improving the quality of an IMS-based multimedia service between electronic devices arranged to each other is disclosed.

Various embodiments disclose a method and device capable of providing an improved call quality service via recovering a packet loss, etc., by enabling quality improvement functions (or QoS techniques) between arranged electronic devices in a case where AVPF is negotiated to be off and a service is initiated, when an IMS-based multimedia service is provided.

Various embodiments disclose a method and device for, after an initial SIP negotiation is completed, transmitting or receiving a message including a specific phrase indicating that a QoS service is available via a packet (e.g., SDES packet, APP packet, or RTP extension, etc.) for media data transport, for which a string configuration is available in an RTCP packet, between electronic devices, and enabling the QoS service regardless of the initial negotiation, thereby allowing an improved call quality service to be provided.

Solution to Problem

An electronic device according to various embodiments of the disclosure may include: a wireless communication module; a processor operatively connected to the wireless communication module; and a memory operatively connected to the processor, wherein the memory stores instructions causing, when executed, the processor to: establish a session for a media service with a counterpart electronic device by using the communication module; after the session is established, include, in a packet, a first message related to the use of a quality service, and transmit the packet to the counterpart electronic device; determine whether the counterpart electronic device is a device available for the quality service, on the basis of a second message in a packet received from the counterpart electronic device; if the counterpart electronic device is a device available for the quality service, enable at least one quality improvement function on the basis of the second message; and while the media service is being performed, transmit a packet having an improved quality to the counterpart electronic device on the basis of the quality improvement function.

An operation method of an electronic device according to various embodiments of the disclosure may include: establishing a session for a media service with a counterpart electronic device; after the session is established, including, in a packet, a first message related to the use of a quality service, and transmitting the packet to the counterpart electronic device; determining whether the counterpart electronic device is a device available for the quality service, on the basis of a second message in a packet received from the counterpart electronic device; if the counterpart electronic device is a device available for the quality service, enabling at least one quality improvement function on the basis of the second message; and while the media service is being performed, transmitting a packet having an improved quality to the counterpart electronic device on the basis of the quality improvement function.

Advantageous Effects of Invention

According to an electronic device and an operation method thereof according to various embodiments, in a case where RTCP feedback-based QoS techniques (or quality improvement functions) cannot be used in some countries due to negotiation with AVPF-Off, a call quality can be improved by QoS techniques enabled via recognition between arranged electronic devices.

BRIEF DESCRIPTION OF THE DRAWINGS

FIG. 5A is a diagram illustrating an example of an RTCP SDES packet according to various embodiments;

MODE FOR CARRYING OUT THE INVENTION

Figure 1:
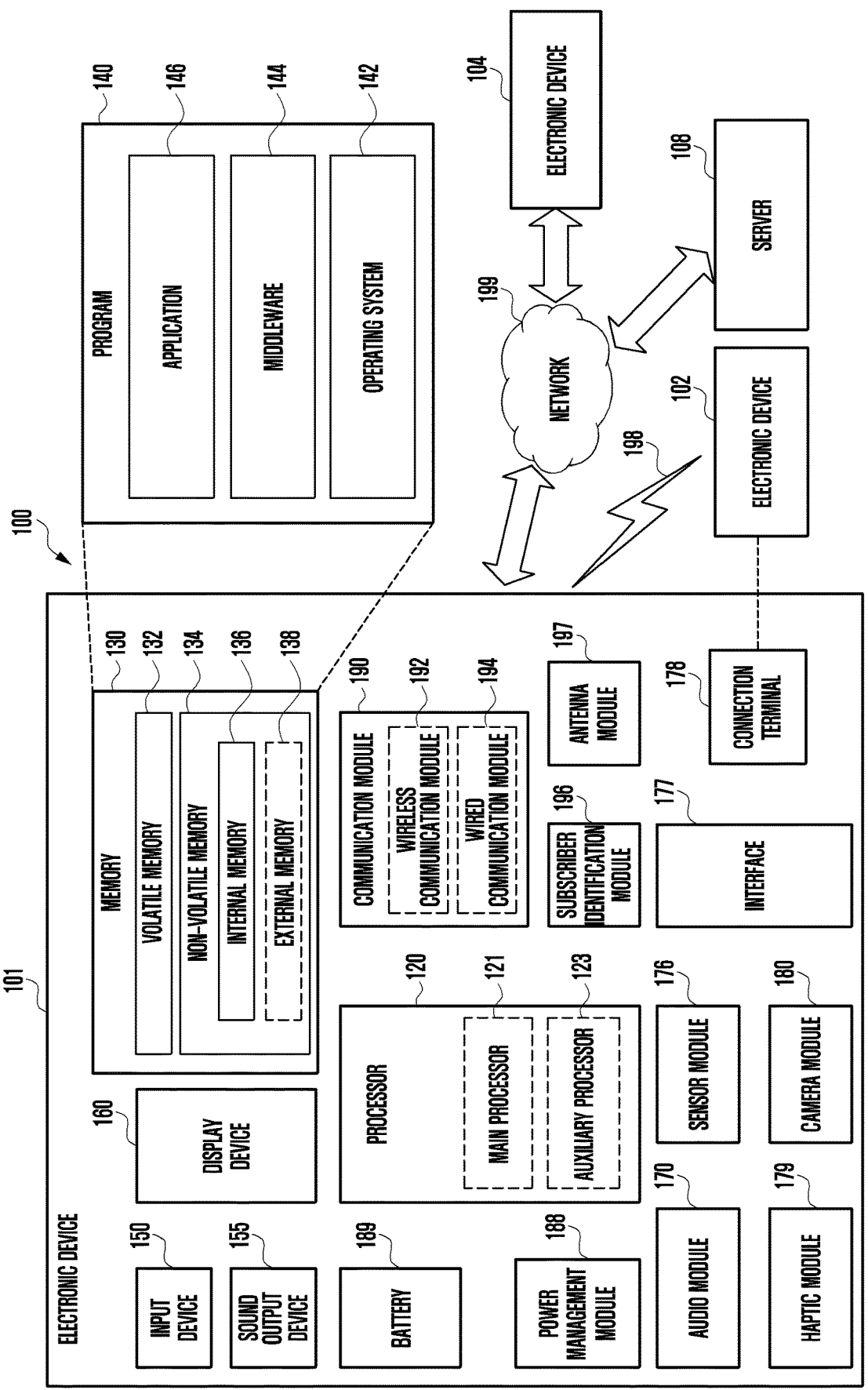
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101. The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
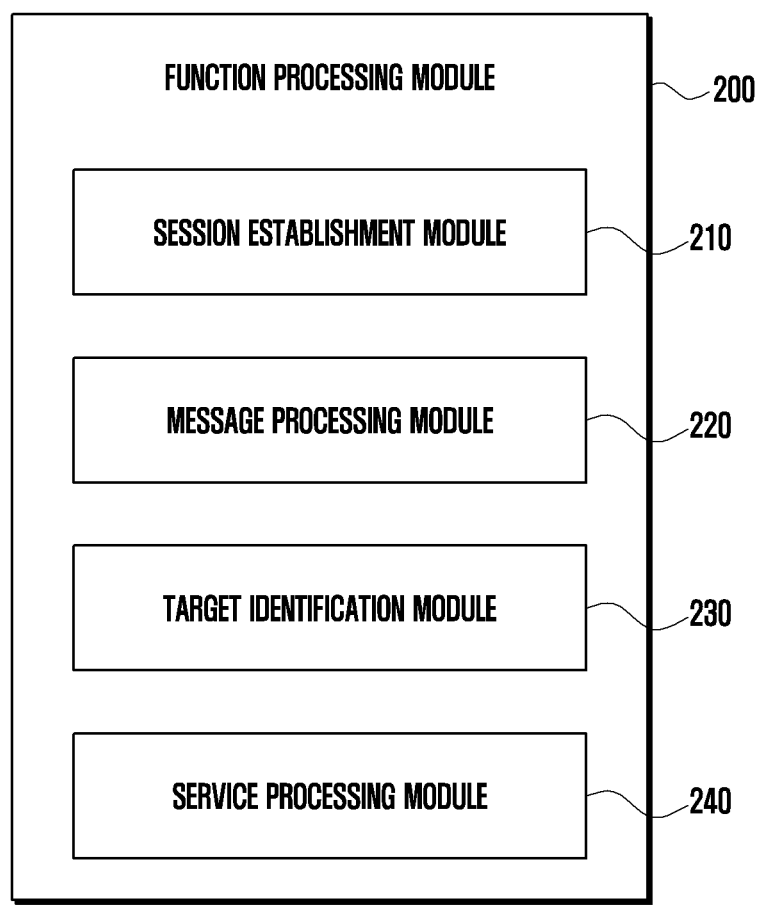
FIG. 2 is a diagram illustrating an example of a function processing module in an electronic device according to various embodiments.

FIG. 2 is a diagram illustrating an example of a function processing module in an electronic device according to various embodiments.

As shown in FIG. 2, FIG. 2 may illustrate an example of a module (e.g., a function processing module 200) executing a function related to providing an Internet protocol (IP) multimedia subsystem (IMS)-based multimedia service (or media service) (e.g., video call and/or voice call) in various embodiments. The function processing module 200 (or the processor 120) according to various embodiments may provide an improved call quality service via packet loss recovery or the like by enabling quality improvement functions (or QoS techniques) between arranged electronic devices, according to an embodiment, when audio-visual profile with feedback (AVPF) is negotiated to be off and the service is initiated. The function processing module 200 (or the processor 120) according to various embodiments may provide a more improved call quality service by additionally enabling quality improvement functions (or QoS techniques) that are not enabled between arranged electronic devices in a negotiation procedure, according to an embodiment, when AVPF is negotiated to be on and the service is initiated.

The function processing module 200 (or the processor 120) according to various embodiments may provide a media service of more improved quality by enabling quality improvement functions via an additional second negotiation phase for checking the capability of a counterpart electronic device in a media engine level regardless of a first negotiation phase related to session establishment in an IMS stack. For example, when AVPF-Off is negotiated in the first negotiation, the function processing module 200 may recognize the counterpart capability in the second negotiation phase, and may enable at least one quality improvement function that is concurrently supported by the electronic devices of both sides. As another example, when AVPF-On is negotiated in the first negotiation phase, the function processing module 200 may further enable, in the second negotiation phase, an additional quality improvement function concurrently supported by the electronic devices of both sides, in addition to the quality improvement function (or among quality improvement functions that are not supported (or negotiated) in the first negotiation phase) negotiated in the first negotiation phase. For example, when a first function (e.g., generic NACK (negative acknowledgment) and a second function (e.g., temporary maximum media stream bit rate request (TMMBR)) are negotiated in the first negotiation phase (e.g., SIP/SDP negotiation), the function processing module 200 may additionally enable a third function (e.g., picture loss indication (PLI)) in the second negotiation phase (e.g., media engine level).

Hereinafter, for the convenience of description, a case in which AVPF-Off is negotiated in the first negotiation phase is described as an example in various embodiments, but the various embodiments are not limited thereto.

In various embodiments, the function processing module 200 may be included as a hardware module or a software module in a processor (e.g., the processor 120 of FIG. 1) including a processing circuitry.

Referring to FIG. 2, the function processing module 200 may include a session establishment module 210, a message processing module 220, a target identification module 230, or a service processing module 240. In various embodiments, the function processing module 200 illustrated in FIG. 2 represents an embodiment, but is not limited thereto. For example, each module of the function processing module 200 may include a different configuration or an integrated module in which at least one module is merged.

In various embodiments, the session establishment module 210 may perform a negotiation procedure for session establishment (e.g., IMS session) for a media service (e.g., video call and/or audio call service) between electronic devices on the basis of a session initiation protocol (SIP) (or session description protocol (SDP)). For example, when the electronic device 101 operates as a transmission terminal for a media service (e.g., video call), the session establishment module 210 may perform a negotiation procedure via signaling, such as SIP INVITE message transmission, SIP 100 trying message reception, SIP 180 Ringing message reception, SIP 200 OK message reception, and SIP ACK message transmission. For example, when the electronic device 101 operates as a reception terminal for a media service (e.g., video call), the session establishment module 210 may perform a negotiation procedure via signaling, such as SIP INVITE message reception, SIP 100 trying message transmission, SIP 180 Ringing message transmission, SIP 200 OK message transmission, and SIP ACK message reception.

According to an embodiment, the session establishment module 210 may perform negotiation when AVPF is off (hereinafter, referred to as "AVPF-Off") or when AVPF is on (e.g., hereinafter, referred to as "AVPF-On" hereinafter). In various embodiments, AVPF may, via a signaling configuration, configure a function of each individual type in units of real-time protocol (RTP) sessions, or indicate an RTCP feedback profile (or message) for negotiation.

According to an embodiment, via AVPF, at least one function related to quality improvement of a video call may be enabled. In an embodiment, a function (hereinafter, referred to as "quality improvement function" or "QoS technique") for quality improvement, which is defined in AVPF, may include, for example, picture loss indication (PLI), generic negative acknowledgment (NACK), frame loss indication (FLI), temporary maximum media stream bit request (TMMBR), etc. For example, the generic NACK relates to packet retransmission, and is used, for example, to indicate an RTP packet loss, and the electronic device 101 may transmit an intra frame as soon as possible by using the generic NACK as a hint. Detailed descriptions of AVPF are described in the RTCP standard (e.g., RFC 5104 and RFC 4585), and therefore the detailed descriptions thereof will be omitted.

According to an embodiment, the session establishment module 210 may perform a session negotiation procedure without exchanging AVPF during the negotiation procedure. According to another embodiment, the session establishment module 210 may perform negotiation with AVPF-On. For example, the session establishment module 210 may enable at least one of quality improvement functions (or techniques) defined in AVPF during the negotiation procedure and provide related information.

In various embodiments, the session establishment module 210 may process the negotiation procedure in an IMS stack stage of the electronic device 101. In various embodiments, if the negotiation procedure is performed in the IMS stack stage when AVPF is off, the session establishment module 210 may transmit first information (e.g., enable the quality improvement function) to an IMS engine stage (e.g., the message processing module 220) of the electronic device 101.

In various embodiments, the message processing module 220 may receive the first information from the session establishment module 210 when the negotiation procedure is performed in the IMS stack stage when AVPF is off. The message processing module 220 may include (or load), in a packet, a message indicating the quality improvement function supported by the electronic device 101 and transmit the message to the outside (e.g., a counterpart electronic device) in response to reception of the first information. According to various embodiments, the message processing module 220 may determine whether the message is included, from an RTCP packet received from an external device.

In various embodiments, the packet may represent, for example, media data (or RTCP packet). In an embodiment, the RTCP packet (or RTCP message format) may include a sender report (SR) packet, a receiver report (RR) packet, a source description (SDES) packet, a goodbye (BYE) packet, an application (APP) packet, etc. In various embodiments, the message related to the quality improvement function may use a packet for media data transport in which a string configuration is possible in the RTCP packet. According to an embodiment, the message related to the quality improvement function according to various embodiments may use an RTCP SDES packet, an RTCP APP packet, or an RTP Extension (e.g., RFC 5285).

According to various embodiments, there exists a negotiation phase of a media engine (or IMS engine, e.g., video engine or speech engine) level, differing from SIP/SDP negotiation, and the capability of the counterpart electronic device may be checked via media transport at least on the basis of RTCP SDES, RTCP APP, RTP Extension, or the like. Based on this, the electronic devices 101 (e.g., a transmission electronic device and a reception electronic device) according to various embodiments may enable at least one function (e.g., a quality improvement function) supported concurrently between each other. Hereinafter, in various embodiments, an RTCP SDES packet among the packets is used as an example, but the disclosure is not limited thereto.

According to various embodiments, the message related to the quality improvement function may be configured in a CNAME field of an RTCP SDES packet. According to various embodiments, the message related to the quality improvement function may be configured in a NAME field of the APP packet of the RCTP packet. For example, the message according to various embodiments may use a packet having a field enabling a string input. In various embodiments, a message structure (or format) configured (or defined) in the CNAME field of the SDES packet will be described with reference to the accompanying drawings.

In various embodiments, the target identification module 230 may determine, based on a message received from a counterpart electronic device (e.g., an electronic device in which a session is established), whether a service, to which the quality improvement function has been applied, is available with the counterpart electronic device. For example, the target identification module 230 may determine whether the counterpart electronic device is a device capable of performing the service based on the quality improvement function. According to an embodiment, the target identification module 230 may parse the message to analyze each identifier of the message, and if an identifier belongs to a recognizable (or pre-arranged) identifier, the target identification module 230 may determine that the counterpart electronic device is a service-available device using the quality improvement function. In various embodiments, if the counterpart electronic device is determined to be a device available for the service, the target identification module 230 may compare function information of a transmitted message with function information of a received message so as to enable a matching function. In various embodiments, an operation of determining a counterpart electronic device on the basis of a message and enabling a quality improvement function will be described with reference to the accompanying drawings.

In various embodiments, the service processing module 240 may process an operation for a multimedia service with a counterpart electronic device for which a session has been established. According to various embodiments, the service processing module 240 may perform a service with an improved quality corresponding to at least one quality improvement function. According to an embodiment, the service processing module 240 may improve QoS by at least one of packet loss recovery or intra frame request/transmission.

The electronic device 101 according to various embodiments of the disclosure may include: the wireless communication module 190 (e.g., the wireless communication module 192 of FIG. 1); the processor 120 operatively connected to the wireless communication module 190; and the memory 130 operatively connected to the processor 120, wherein the memory 130 stores instructions causing, when executed, the processor 120 to: establish a session for a media service with a counterpart electronic device by using the communication module 190; after the session is established, include, in a packet, a first message related to the use of a quality service, and transmit the packet to the counterpart electronic device; determine whether the counterpart electronic device is a device available for the quality service, on the basis of a second message in a packet received from the counterpart electronic device; if the counterpart electronic device is a device available for the quality service, enable at least one quality improvement function on the basis of the second message; and while the media service is being performed, transmit a packet having an improved quality to the counterpart electronic device on the basis of the quality improvement function.

According to various embodiments, the session for the media service may include a state in which audio-visual profile feedback (AVPF) is negotiated to be off and the quality service is thus unavailable.

According to various embodiments, the first message or the second message may include a string-based message included in a real-time transport control protocol (RTCP) source description (SDES) packet.

According to various embodiments, the string-based message may be configured for a canonical name (CNAME) of the RTCP SDES packet.

According to various embodiments, the string-based message may be configured in a string format including a first identifier for identifying an electronic device or a vendor of the electronic device, a second identifier for identifying a service type, and a third identifier for identifying a quality improvement function for the quality service. According to an embodiment, either the second identifier or the third identifier may be omitted.

According to various embodiments, the first identifier may include a form of a syntax enabling identification of the electronic device or a vendor of the electronic device, the second identifier may include a form of at least one character indicating that a service to be provided relates to a quality service (QoS) in the media service, and the third identifier may include a form of a specific value corresponding to at least one function supported as a quality improvement function by the electronic device in the media service.

According to various embodiments, the third identifier may include at least one specific value corresponding to a quality improvement function supported by the electronic device from among quality improvement functions of PLI, generic NACK, FLI, or TMMBR, which are defined in AVPF.

According to various embodiments, after the session is established, the processor 120 may determine whether the counterpart electronic device is a device available for a service based on the quality improvement function, at least on the basis of the first or second identifier, and may determine a quality improvement function supported by the counterpart electronic device, at least on the basis of the third identifier.

According to various embodiments, if the counterpart electronic device is a device available for the service, the processor 120 may enable a quality improvement function matching the counterpart electronic device, by referring to the third identifier.

According to various embodiments, the first message or the second message may include a string-based message included in an RTP extension or an RTCP application (APP) packet.

Figure 3:
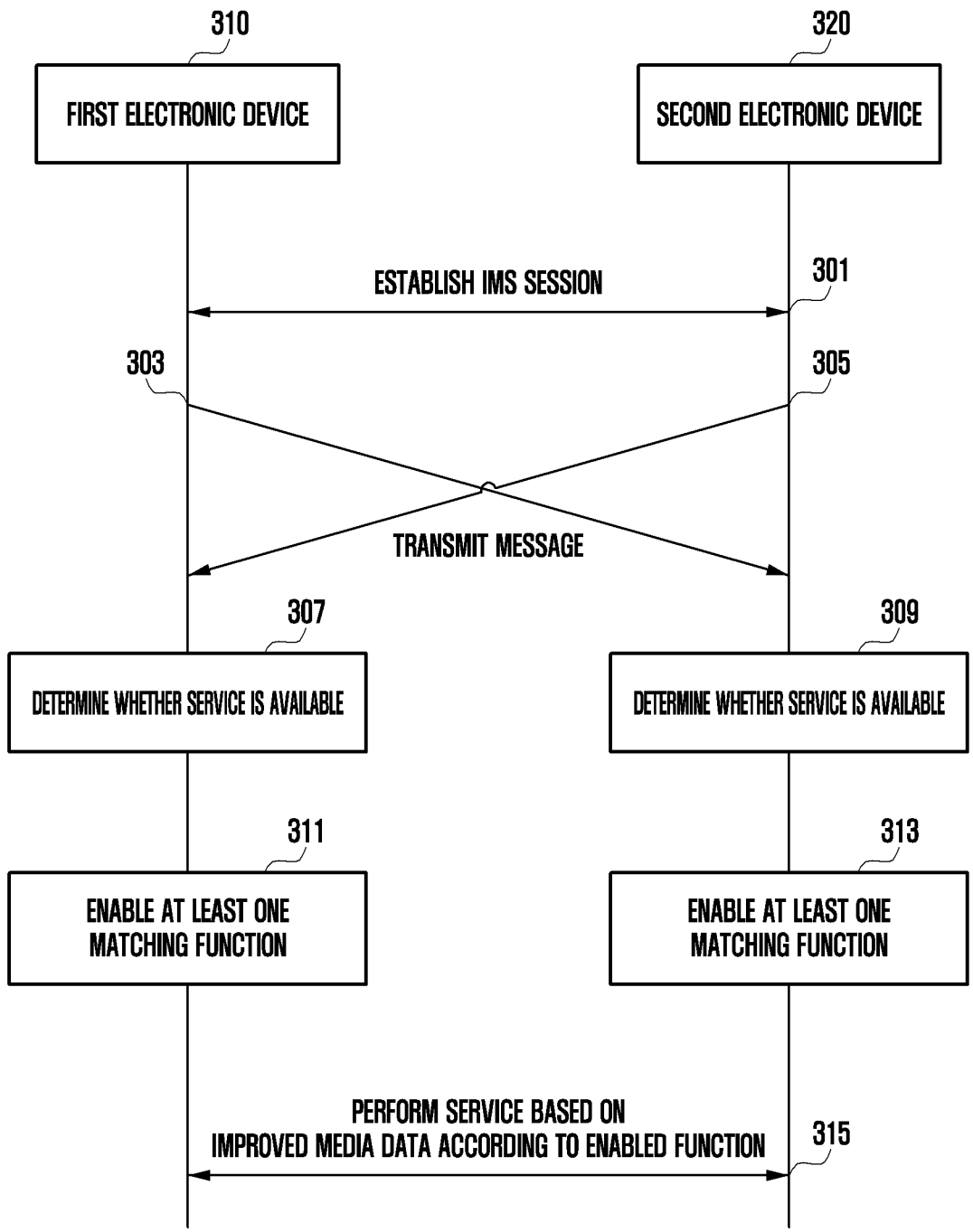
FIG. 3 is a diagram illustrating operations between electronic devices according to various embodiments.

FIG. 3 is a diagram illustrating operations between electronic devices according to various embodiments.

As shown in FIG. 3, FIG. 3 is a diagram illustrating a method of supporting a multimedia service (e.g., an IMS-based video call service and/or voice call service) by quality improvement between electronic devices. According to an embodiment, FIG. 3 shows an example in which a first electronic device 310 and a second electronic device 320 negotiate AVPF to be off in a negotiation procedure for session establishment, but the disclosure is not limited thereto. In various embodiments, each of the first electronic device 310 and the second electronic device 320 may be either the same type of device as the electronic device 101 of FIG. 1 or a different type of device from the electronic device 101 of FIG. 1, and may include all or some of the elements of the electronic device 101 of FIG. 1. According to various embodiments, operations of FIG. 3 may be operations generated by processors (e.g., the processor 120 of FIG. 1) of the first electronic device 310 and the second electronic device 320.

Referring to FIG. 3, in operation 301, the first electronic device 310 and the second electronic device 320 according to various embodiments may establish an IMS session. According to an embodiment, the first electronic device 310 and the second electronic device 320 may perform a negotiation procedure on the basis of SIP for an IMS-based multimedia service (e.g., video call and/or voice call) and may establish the session according to the negotiation procedure.

According to various embodiments, in operation 303 and operation 305, the first electronic device 310 and the second electronic device 320 may transmit an RTCP packet (e.g., media data) including a message to each other. According to an embodiment, the message may be included in an SDES packet in the RTCP packet so as to be transmitted or received. According to various embodiments, after a negotiation is completed, the first electronic device 310 and the second electronic device 320 may include, in a CNAME field of the SDES packet, string-based identification information (e.g., a specific phrase or message) indicating that a function for quality improvement is supported, and may transmit the SDES packet.

In an example of FIG. 3, transmission or reception of the RTCP packet (e.g., message) including the message is illustrated as a single signaling, but this is illustrated for the convenience of explanation, and the RTCP packet may be continuously transmitted or received while a video call is being performed. In various embodiments, the first electronic device 310 and the second electronic device 320 may determine whether a service (e.g., video call) by a quality improvement function is possible, by using a first transmitted or received RTCP packet. In various embodiments, operation 303 and operation 305 may be performed first by any electronic device, or may be performed concurrently by each electronic device.

According to various embodiments, in operation 307 and operation 309, the first electronic device 310 and the second electronic device 320 may determine whether a service, to which the quality improvement function has been applied, is available with a counterpart electronic device (e.g., an electronic device in which a session has been established), on the basis of the RTCP packet (e.g., media data including a message) received from the counterpart electronic device. For example, the first electronic device 310 and the second electronic device 320 may determine whether the counterpart electronic device is a device capable of performing the service based on the quality improvement function. According to an embodiment, the first electronic device 310 and the second electronic device 320 may parse the message of the RTCP packet to analyze each identifier of the message, and if an identifier belongs to a recognizable (or pre-arranged) identifier, the first electronic device 310 and the second electronic device 320 may determine that the counterpart electronic device is a device available for the service based on the quality improvement function.

According to various embodiments, in operation 311 and operation 313, the first electronic device 310 and the second electronic device 320 may enable at least one matching function, if the counterpart electronic device is determined to be a device available for the service. According to an embodiment, the first electronic device 310 and the second electronic device 320 may compare first function information thereof, which has been transmitted to the counterpart electronic device, with second function information of the counterpart electronic device, which has been received from the counterpart electronic device, so as to determine at least one piece of matching information.

According to various embodiments, in operation 315, the first electronic device 310 and the second electronic device 320 may perform the service on the basis of improved media data according to the enabled function. According to an embodiment, the first electronic device 310 and the second electronic device 320 may perform the service with an improved quality corresponding to at least one quality improvement function. According to an embodiment, the first electronic device 310 and the second electronic device 320 may improve QoS by at least one of packet loss recovery or intra frame request/transmission.

According to various embodiments, after the negotiation (e.g., SIP/SDP negotiation by AVPF-Off) for initial session establishment is completed, the electronic device 101 (e.g., the first electronic device 310 or the second electronic device 320) may perform transmission/reception via the RTCP packet (e.g., media data) including the message (e.g., string-based identification information (e.g., specific phrase)) indicating that the service based on quality improvement is available, and the electronic device 101 (e.g., the first electronic device 310 or the second electronic device 320) having confirmed the transmission/reception may enable (or activate) a quality improvement function that matches each other regardless of the initial negotiation (e.g., negotiation by AVPF-Off), and may improve the quality of the media data (e.g., video) on the basis of the quality improvement function. For example, the electronic device 101 may perform the service (e.g., video call) on the basis of the media data improved by packet loss recovery, intra frame transmission, or the like.

According to various embodiments, the electronic device 101 may transmit or receive an RTCP SDES packet during a real-time IMS video call. In the case of a general electronic device, a string (e.g., anonymous@unknown.com) indicating that blank or specific information corresponding thereto is not indicated may be included in the CNAME of the current RTCP SDES packet. Therefore, there is a problem in that even an electronic device available for a quality improvement function (or QoS technology) is unable to support a service based on quality improvement, in a network (e.g., a service provider network) negotiated with AVPF-Off in the initial stage (e.g., session establishment procedure). However, according to various embodiments, in the network negotiated with AVPF-Off, the electronic device 101 may perform modification so that a message (e.g., string-based identification information, for example, a specific phrase that is mutually identifiable between electronic devices) is included in the CNAME of the RTCP SDES packet so as to be transmitted or received. According to various embodiments, when identifying the identification information of the CNAME of the received RTCP SDES packet, the electronic device 101 may recognize that the counterpart electronic device is available for a quality improvement-based service, and then may enable a quality improvement function (or QoS technology), so as to allow the quality improvement-based service to be performed while the service is being performed (e.g., while a video call is being performed).

Figure 4:
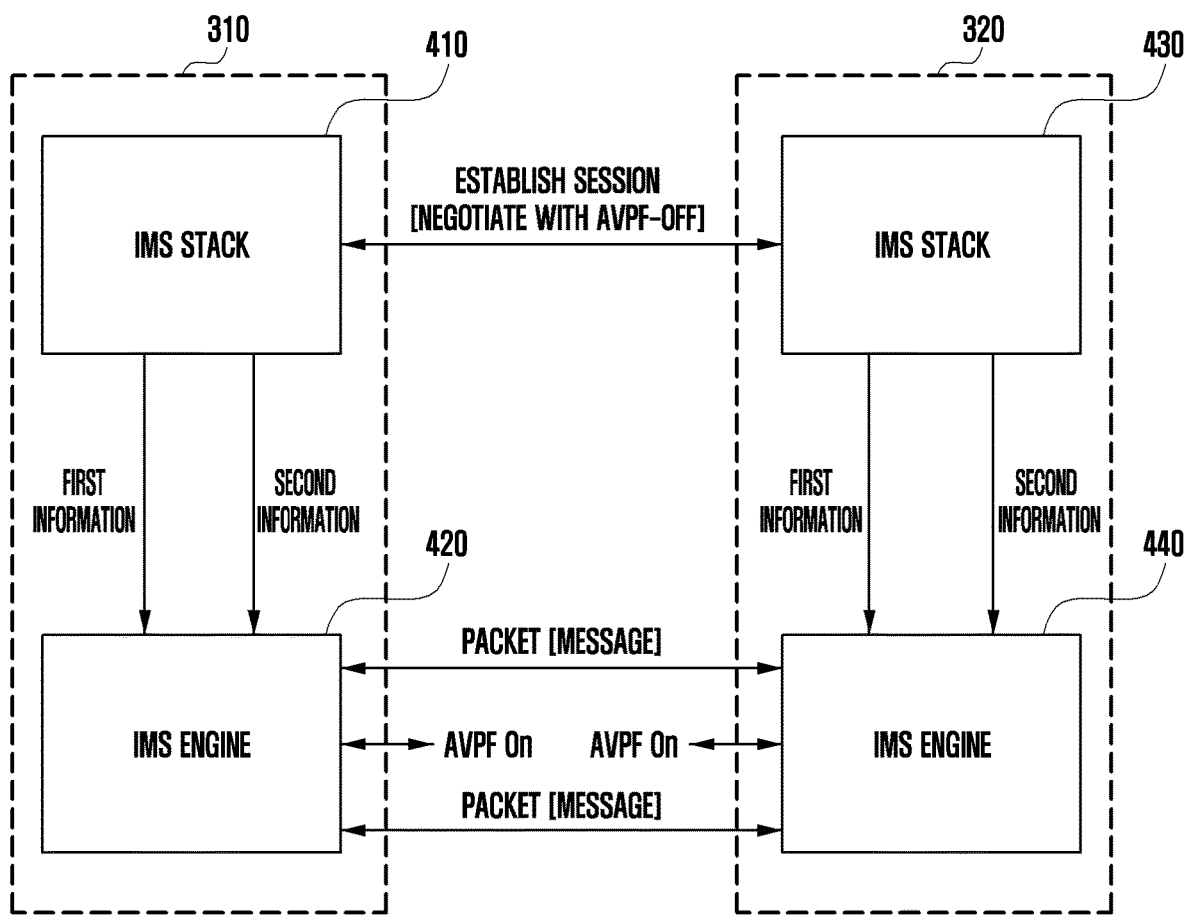
FIG. 4 is a diagram illustrating an operation method for supporting a service based on quality improvement between electronic devices according to various embodiments.

FIG. 4 is a diagram illustrating an operation method for supporting a service based on quality improvement between electronic devices according to various embodiments;

According to an embodiment, as in the example of FIG. 3, FIG. 4 may show an example in which the first electronic device 310 and the second electronic device 320 negotiate AVPF to be off, in a negotiation procedure for session establishment. In various embodiments, each of the first electronic device 310 and the second electronic device 320 may be either the same type of device as the electronic device 101 of FIG. 1 or a different type of device from the electronic device 101 of FIG. 1, and may include all or some of the elements of the electronic device 101 of FIG. 1.

As illustrated in FIG. 4, each of the first electronic device 310 and the second electronic device 320 may operate via IMS stacks 410 and 430 for an IMS-based multimedia service (or media service) (e.g., media service such as a video call and/or voice call) and IMS engines (e.g., media engine such as a voice engine or audio engine and/or a video engine) 420 and 440. According to various embodiments, when performing a multimedia service in an IMS network environment, a quality improvement function may be enabled to provide an improved quality service. Hereinafter, for the convenience of explanation, a video call service is taken as an example, and the IMS engines 420 and 440 are, for example, video engines, but various embodiments are not limited thereto.

According to an embodiment, the IMS stacks 410 and 430 may provide a signaling protocol function for various calls and data (e.g., messaging service) such as a voice call (e.g., VoLTE voice call or a video call (e.g., packet switched video telephony (PSVT) video call), by linking to the IMS network. The architecture of the IMS stacks 410 and 430 may follow the standards, and detailed descriptions thereof will be omitted.

In various embodiments, the first electronic device 310 and the second electronic device 320 may perform a negotiation procedure via the IMS stacks 410 and 430. According to an embodiment, the first electronic device 310 and the second electronic device 320 may proceed with AVPF-Off via the IMS stacks 410 and 430. According to another embodiment, when performing the negotiation procedure via the IMS stacks 410 and 430, the first electronic device 310 and the second electronic device 320 may proceed with AVPF-On in which at least one quality improvement function is enabled.

According to an embodiment, the IMS engines 420 and 440 may process media data for an IP-based video service and may transmit or receive the media data on the basis of an RTCP packet. According to an embodiment, IP-based video services may be transferred to a reception electronic device in a state where a service quality at a transmission electronic device is deteriorated due to an effect of a packet loss on the network. This quality deterioration may become as good as the original quality via various quality improvement (or enhancement) functions, such as error hiding, noise reduction or noise cancellation, jitter buffer control, etc. However, if the negotiation has proceeded with AVPF-Off in the IMS stacks 410 and 430, the quality improvement function capable of quality improvement is disabled (or turned off), so that the service may be provided in a state where quality deterioration occurs.

In various embodiments, if the negotiation has proceeded with AVPF-Off in the IMS stacks 410 and 430, the quality improvement function may be enabled (or turned on) (e.g., AVPF-On) via the IMS engines 420 and 440, so as to improve the quality of an IP-based video service. According to various embodiments, the IMS engines 420 and 440 may recognize a counterpart electronic device at the levels of IMS engines 420 and 440 regardless of negotiation phases of the IMS stacks 420 and 440, so as to enable at least one additional quality improvement function. According to an embodiment, if AVPF-Off is negotiated at the levels of the IMS stacks 410 and 430, the IMS engines 420 and 440 may enable at least one matching quality improvement function. According to another embodiment, if AVPF-On is negotiated at the levels of the IMS stacks 420 and 430, the IMS engines 420 and 440 may additionally enable another quality improvement function that is not enabled (or not negotiated), in addition to the quality improvement function according to AVPF-On. Based on this, the electronic device 101 (e.g., the first electronic device 310 or the second electronic device 320) may allow end users of the IP-based media service (e.g., video service and/or voice service) to experience a high-quality media service.

Referring to FIG. 4, the first electronic device 310 and the second electronic device 320 according to various embodiments may establish a session for an IP-based video service via the IMS stacks 410 and 430. According to an embodiment, the first electronic device 310 and the second electronic device 320 may perform negotiation with AVPF-Off. Various embodiments are not limited thereto, and operations may be performed even when negotiation is performed with AVPF-On.

According to various embodiments, if AVPF-Off is negotiated when the video service is performed, the first electronic device 310 and the second electronic device 320 may transfer first information and second information from the IMS stacks 410 and 430 to the IMS engines 420 and 440. According to an embodiment, the first information may include a specific arranged value (e.g., "0") indicating that AVPF-Off is negotiated. According to an embodiment, the second information may include, for example, at least one specific value (e.g., "1", "2", "3", etc.) related to a quality improvement function that each electronic device 310 or 320 can support (or enable). In various embodiments, an example of performing operations by separating the first information and the second information is provided, but the disclosure is not limited thereto. Further, the first information and the second information may be provided in a single form of information. For example, according to various embodiments, the IMS stacks 410 and 430 may provide one piece of information (e.g., integrated information), in which the first information and the second information are combined, to the IMS engines 420 and 440.

According to various embodiments, if the first information and the second information are obtained via the IMS engines 420 and 440, the first electronic device 310 and the second electronic device 320 may transmit an RTCP SDES packet including a message (e.g., string-based specific phrase) to the counterpart electronic device. In various embodiments, the message may be included in a CNAME field of the RTCP SDES packet, and may include at least one piece of information (or specific value) corresponding to (e.g., for the quality improvement function supported by each electronic device from among the quality improvement functions defined in AVPF) the second information. According to an embodiment, the first electronic device 310 and the second electronic device 320 may configure a message (e.g., string-based specific phrase) by using the CNAME field of the RTCP SDES packet. An RTCP SDES packet structure and a message structure according to various embodiments will be described with reference to FIG. 5A and FIG. 5B to be described later.

According to various embodiments, if the first electronic device 310 and the second electronic device 320 receive the RTCP packet (e.g., media data) related to a video call from the counterpart electronic device, the first electronic device 310 and the second electronic device 320 may check the message included in the RTCP packet (e.g., first received media). According to an embodiment, the first electronic device 310 and the second electronic device 320 may check the message (e.g., string-based specific phrase) by referring to the CNAME field of the SDES packet in the RTCP packet. According to various embodiments, the first electronic device 310 and the second electronic device 320 may check at least one matching quality improvement function on the basis of the message of the received RTCP packet, and may enable the corresponding quality improvement function. According to an embodiment, the first electronic device 310 and the second electronic device 320 may enable (e.g., AVPF-On) at least one matching quality improvement function among the quality improvement functions defined in AVPF.

According to various embodiments, the first electronic device 310 and the second electronic device 320 may continuously transmit or receive the packet (e.g., media data) including the message while a session is being maintained (or while the video service is being performed), and may provide a high-quality video service to users of the video service while preventing quality deterioration, by the quality improvement function according to AVPF-On.

According to various embodiments, the IMS engine (or media engine) 420 or 440 may activate NACK feedback regardless of the negotiation phases in the IMS stacks 410 and 430. For example, the electronic device 101 (or the processor 120) may determine, regardless of negotiation of the IMS stacks 410 and 430, whether the counterpart electronic device is available for a service based on the quality improvement function in the IMS engine 420 and 440 (or whether rate adaptation is possible), and then may perform negotiation (e.g., performing rate adaptation) for checking the quality improvement function. According to an embodiment, after performing rate adaptation in the IMS engines 410 and 430, the electronic device 101 may pre-fix an RTCP packet transmission interval of the counterpart electronic device in the IMS engines 420 and 440, may predict a network condition by using the fixed RTCP packet transmission interval, and then may improve a service quality according to the predicted network condition.

Figure 5B:
FIG. 5B is a diagram illustrating an example of a message structure according to various embodiments.

FIG. 5A is a diagram illustrating an example of an RTCP SDES packet according to various embodiments. FIG. 5B is a diagram illustrating an example of a message structure according to various embodiments.

Referring to FIG. 5A, in FIG. 5A, a "V" field indicates a version of an RTP, and a "P" field indicates padding. According to an embodiment, if the "P" field is configured, an RTCP packet may include additional padding octets at the end. The semantics of the "P" field may be the same as that of the padding field in a sender report (SR) packet. The "PT" field indicates a packet type, and may include type information (e.g., payload (or constant) of 202) for confirming a type (e.g., SDES packet) of the RTCP packet. A "length" field indicates a length of the RTCP packet, and an "SSRC/CSRC" field indicates a synchronization source identifier for an originator of the RTCP packet. In addition, an "SDES" field indicates source description items and may include a CNAME.

According to an embodiment, the SDES items are encoded according to a type-length-value scheme, and CNAME, NAME, EMAIL, PHONE, LOC, TOOL, NOTE, and PRIV items may be defined. In various embodiments, a CNAME item may be used in the SDES items. According to an embodiment, a CNAME item may be an item essentially included in the SDES packet which is an essential part of the RTCP packet.

According to various embodiments, as shown in FIG. 5A, CNAME may include identification information. In various embodiments, the identification information may represent a string-based message (or specific phrase). In various embodiments, identification information defined in CNAME may be defined in the form of a string-based message (or specific phrase) (e.g., simsq1,2,4@samsung.com), and an example of the defined identification information is illustrated in FIG. 5B.

Referring to FIG. 5B, according to various embodiments, identification information (or identifier) defined in CNAME of the SDES packet may include information enabling to recognize that a video service based on a quality improvement function is possible, by referring to CNMAE between arranged electronic devices (e.g., electronic devices from the same vendor (or manufacturer)). According to an embodiment, the identification information may include, for example, an identifier (e.g., a first identifier 510 or a second identifier 520) for identifying the electronic device 101 or a vendor of the electronic device 101, an identifier (e.g., a third identifier 530) for identifying a service type (or a service type and a service) and an identifier (e.g., a fourth identifier 540) for identifying a provided quality improvement function.

According to an embodiment, the first identifier 510 (e.g., "samsung.com") may have a syntax format that enables identification of the electronic device 101 or the vendor of the electronic device 101 and, for example, a format of a host or domain name indicating the vendor may be used.

According to an embodiment, the second identifier 520 (e.g., "s") may have a format of at least one representative character (or identifier) that enables the electronic device 101 to be identified as the electronic device 101 of the vendor according to the first identifier and, for example, "s" which is the representative character (or identifier) of the vendor (e.g., "Samsung") may be used. According to an embodiment, the second identifier may be optional, and only the first identifier 510 may be used as an identifier for identifying the electronic device 101 or the vendor of the electronic device 101.

According to an embodiment, the third identifier 530 (e.g., "imsq") may have a format of at least one character (or identifier) indicating that a service to be provided relates to a quality service (QoS) in an IMS-based video service and, for example, "imsq" which enables identification of "QoS" and "IMS" may be used. According to various embodiments, by using only the fourth identifier 540 without (or omitting) the third identifier 530, roles corresponding to the third identifier 530 and the fourth identifier 540 may be included.

According to an embodiment, the fourth identifier 540 (e.g., "x, y, z") may have a format of a specific value (e.g., number) corresponding to at least one function that the electronic device 101 supports as a quality improvement function in the IMS-based video service. According to an embodiment, the fourth identifier 540 may include at least one specific value for the quality improvement function supported by the electronic device among quality improvement functions (e.g., 4 functions, such as a first function (e.g., PLI, specific value=1), a second function (e.g., generic NACK, specific value=2), a third function (e.g., FLI, specific value=3), or a fourth function (e.g., TMMBR, specific value=4)) defined in AVPF. According to an embodiment, when the electronic device 101 supports a plurality of quality improvement functions, the functions may be divided based on comma (e.g., ","), dot (e.g., "."), semicolon (e.g., ";"), or colon (e.g., ":") between specific values of the respective quality improvement functions.

According to an embodiment, if the electronic device 101 supports the first function, the fourth identifier 540 may have a format of "1". According to an embodiment, if the electronic device 101 supports the second function and the third function, the fourth identifier 540 may have a format of "2, 3". According to an embodiment, if the electronic device 101 supports the first function, the second function, and the fourth function, the fourth identifier 540 may have a format of "1, 2, 4". According to an embodiment, if the electronic device 101 supports all of the first to fourth functions, the fourth identifier 540 may have a format of "1, 2, 3, 4".

According to various embodiments, after a session is established, the electronic device 101 may determine whether a service based on the quality improvement function is available, by referring to CNAME of the transmitted or received RTCP SDES packet, and may determine a matching quality improvement function between electronic devices if the service is available, so as to provide the service by applying at least one quality improvement function.

According to various embodiments, in FIG. 5A and FIG. 5B, an RTCP SDES packet has been described as an example, but various embodiments are not limited thereto. For example, a message related to a quality improvement function according to various embodiments may use an RTCP SDES packet, an RTCP APP packet, or an RTP Extension (e.g., RFC 5285). According to various embodiments, there exists a negotiation phase of a media engine (or IMS engine, e.g., video engine or speech engine) level, differing from SIP/SDP negotiation, and the capability of a counterpart electronic device may be checked via media transport at least on the basis of RTCP SDES, RTCP APP, RTP Extension, or the like. Based on this, the electronic devices 101 (e.g., a transmission electronic device and a reception electronic device) according to various embodiments may enable at least one function (e.g., a quality improvement function) supported concurrently between each other.

Figure 6:
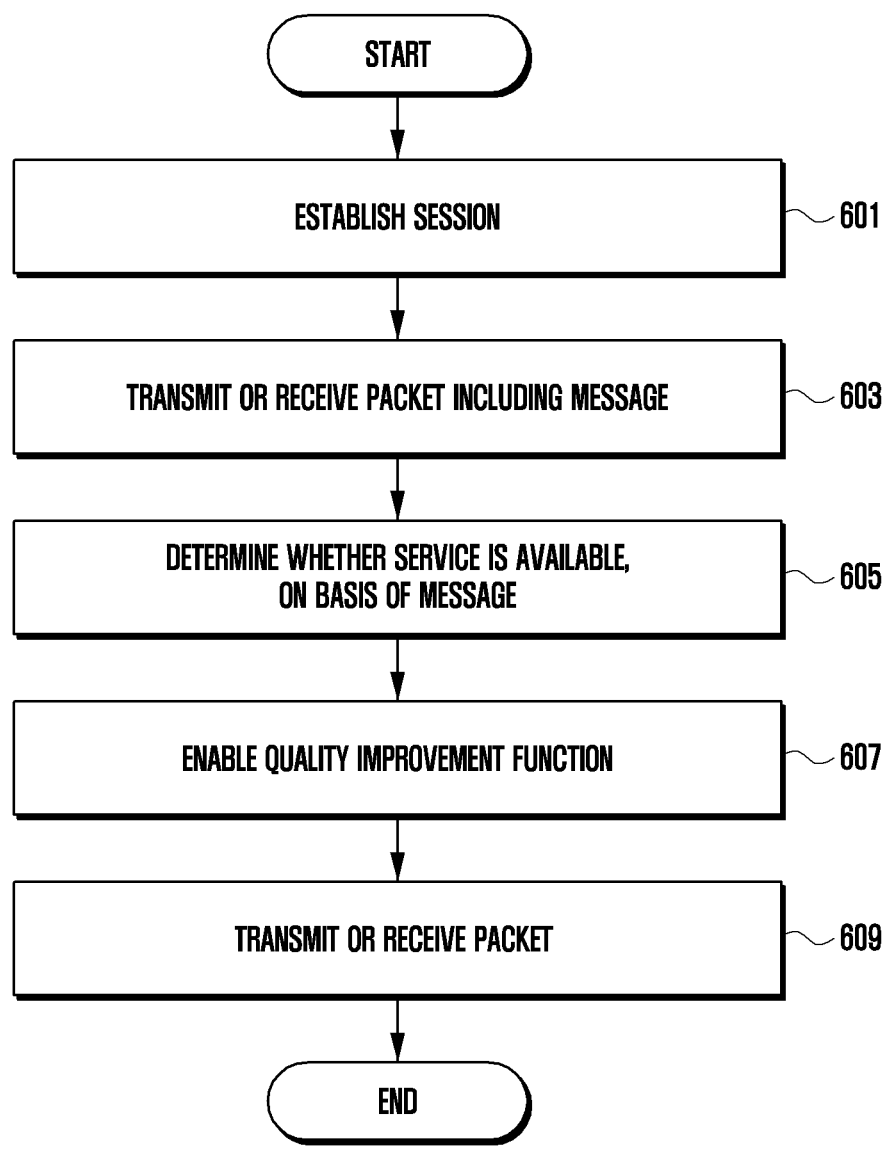
FIG. 6 is a flowchart illustrating an operation method of an electronic device according to various embodiments.

FIG. 6 is a flowchart illustrating an operation method of an electronic device according to various embodiments.

Referring to FIG. 6, in operation 601, the processor 120 (e.g., at least one processor including a processing circuitry) (or the function processing module 200 of FIG. 2) of the electronic device 101 according to various embodiments may establish an IMS session with a counterpart electronic device. According to an embodiment, the processor 120 may perform a negotiation procedure based on SIP for an IMS-based video call and may establish the session according to the negotiation procedure. According to an embodiment, the processor 120 may perform negotiation with AVPF-Off.

According to various embodiments, in operation 603, the processor 120 may transmit/receive a packet including a message (e.g., media data) to/from the counterpart electronic device. According to an embodiment, the processor 120 may include a message in an RTCP SDES packet. According to an embodiment, after negotiation is completed, the processor 120 may include, in CNAME of an SDES packet, a string-based message indicating that the electronic device 101 supports a quality improvement function, and may transmit the SDES packet.

According to various embodiments, in operation 605, the processor 120 may determine whether the counterpart electronic device is available for a service based on the quality improvement function, on the basis of the message of the RTCP SDES packet received from the counterpart electronic device. According to an embodiment, the processor 120 may determine whether the service, to which the quality improvement function has been applied, is available with the counterpart electronic device (e.g., an electronic device in which the session is established), on the basis of the RTCP SDES packet (e.g., media data including the message) received from the counterpart electronic device. For example, the processor 120 may determine whether the counterpart electronic device is a device capable of performing the service based on the quality improvement function. According to an embodiment, the processor 120 may parse the message of the RTCP SDES packet to analyze each identifier of the message, and if the identifier belongs to a recognizable (or pre-arranged) identifier (e.g., if the counterpart electronic device is determined to be an electronic device from the same vendor), the processor 120 may determine that the counterpart electronic device is a device available for the service based on the quality improvement function.

According to various embodiments, in operation 607, if the counterpart electronic device is determined to be a service-available device, the processor 120 may enable at least one matching quality improvement function. According to an embodiment, the processor 120 may compare its own first function information (e.g., the fourth identifier 540 of FIG. 5B) transmitted to the counterpart electronic device with second function information (e.g., the fourth identifier 540 of FIG. 5B) of the counterpart electronic device, which is received from the counter electronic device, may determine at least one matching quality improvement function, and may enable the at least one matching quality improvement function.

According to various embodiments, in operation 609, the processor 120 may transmit or receive a packet with an improved quality according to the enabled quality improvement function. According to an embodiment, the processor 120 may perform a video service with an improved quality corresponding to the at least one quality improvement function. According to an embodiment, the processor 120 may improve QoS by at least one of packet loss recovery or intra frame request/transmission.

Figure 7:
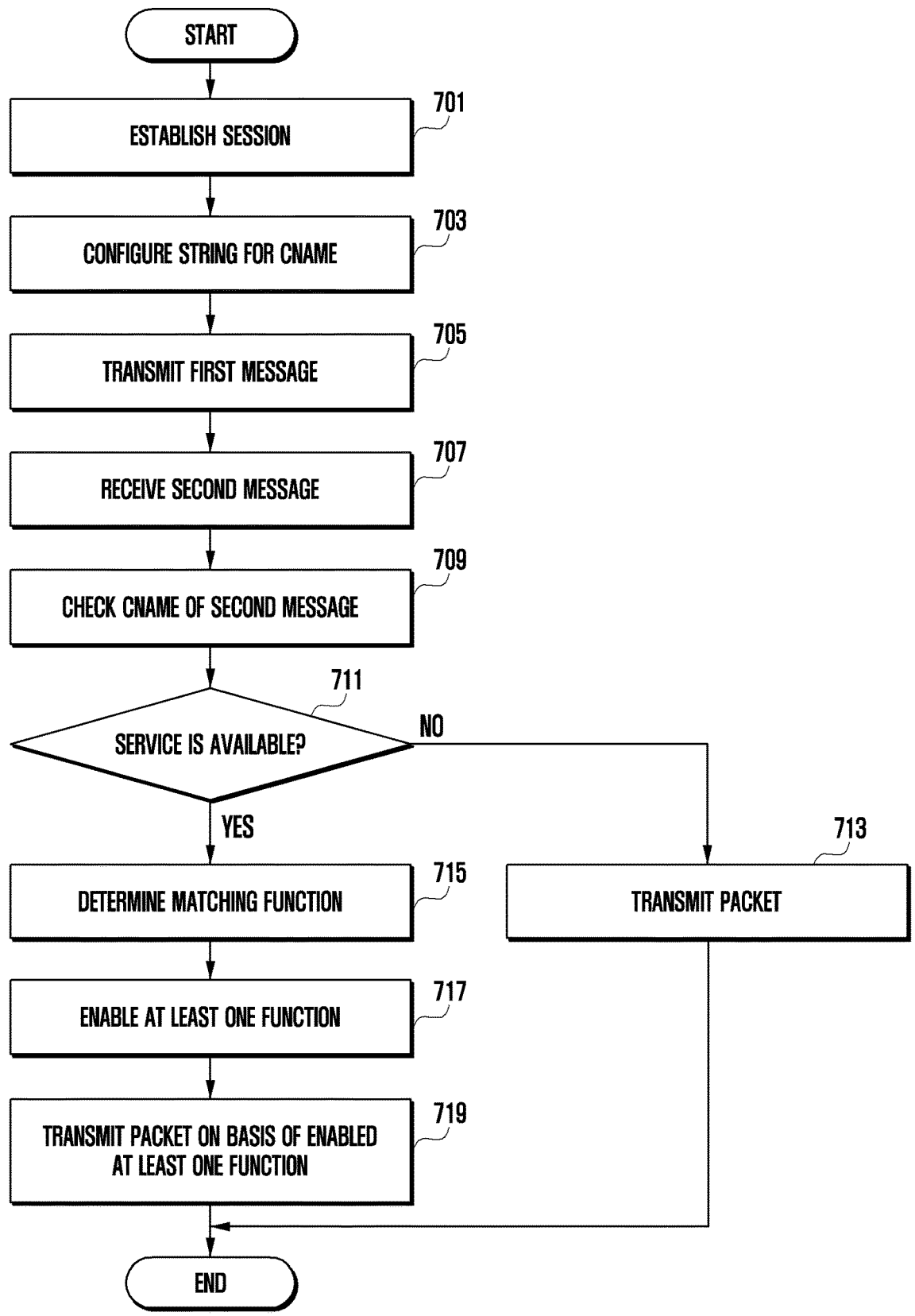
FIG. 7 is a flowchart illustrating an operation method of an electronic device according to various embodiments.

FIG. 7 is a flowchart illustrating an operation method of an electronic device according to various embodiments.

Referring to FIG. 7, in operation 701, the processor 120 (e.g., at least one processor including at least one processing circuitry) according to various embodiments may establish an IMS session with a counterpart electronic device.

According to various embodiments, in operation 703, the processor 120 may configure a string in an RTCP SDES packet. According to an embodiment, after negotiation is completed, the processor 120 may configure, for CNAME of the RTCP SDES packet, a string-based message (or specific phrase) defined for a video service based on a quality improvement function.

According to various embodiments, in operation 705, the processor 120 may transmit the RTCP SDES packet including a message (hereinafter, referred to as a "first message") to the counterpart electronic device.

According to various embodiments, in operation 707, the processor 120 may receive the RTCP SDES packet including a message (hereinafter, referred to as a "second message") from the counterpart electronic device. According to various embodiments, operations 705 and 707 may be performed sequentially, in parallel, or in reverse order. For example, operation 707 may precede operation 705.

According to various embodiments, in operation 709, the processor 120 may check CNAME of the second message of the received RTCP SDES packet.

According to various embodiments, in operation 711, the processor 120 may determine whether the counterpart electronic device is available for a service based on a quality improvement function. According to an embodiment, the processor 120 may determine whether the counterpart electronic device is available for the service based on the quality improvement function, on the basis of the second message of the RTCP SDES packet received from the counterpart electronic device. According to an embodiment, the processor 120 may parse the second message of the RTCP SDES packet to analyze each identifier of the message, and if the identifier belongs to a recognizable (or pre-arranged) identifier (e.g., if the counterpart electronic device is determined to be an electronic device from the same vendor), the processor 120 may determine that the counterpart electronic device is a device available for the service based on the quality improvement function.

According to various embodiments, in operation 711, if the processor 120 determines that the counterpart electronic device is not a service-available device ("No" in operation 711), the processor 120 may transmit a packet (e.g., media data), to which the quality improvement function has not been applied, in operation 713. According to various embodiments, based on the second message, the processor 120 may determine whether the counterpart electronic device is available for the service, at least on the basis of, for example, the first identifier 510, the second identifier 520, or the third identifier 530, which is illustrated as an example in FIG. 5B. According to an embodiment, if the first identifier 510 is not identified in the second message, the processor 120 may determine that the counterpart electronic device is not a service-available device. According to an embodiment, if the first identifier 510 is identified and the second identifier 520 or the third identifier 530 is not identified in the second message, the processor 120 may determine that the counterpart electronic device is not a service-available device.

According to various embodiments, if the counterpart electronic device is determined, in operation 711, to be a service-available device ("Yes" in operation 711), the processor 120 may determine a matching function in operation 715. According to various embodiments, in the second message, if, for example, the first identifier 510 illustrated in FIG. 5B is identified, the processor 120 may determine that the counterpart electronic device is an electronic device of the same vendor, and if the second identifier 520 or the third identifier 530 is identified, the processor 120 may determine that the counterpart electronic device is a service-available device based on the quality improvement function. According to an embodiment, if the counterpart electronic device is determined to be a service-available device, the processor 120 may identify the fourth identifier 540 in the second message and may determine a quality improvement function that matches the electronic device 101.

According to various embodiments, in operation 717, the processor 120 may enable at least one matching quality improvement function. According to an embodiment, the processor 120 may compare its own first function information (e.g., the fourth identifier 540 of FIG. 5B) transmitted to the counterpart electronic device with second function information (e.g., the fourth identifier 540 of FIG. 5B) of the counterpart electronic device, which is received from the counter electronic device, may determine at least one matching quality improvement function, and may enable the at least one matching quality improvement function.

According to various embodiments, in operation 719, the processor 120 may transmit a packet (e.g., media data) with an improved quality according to the enabled at least one quality improvement function. According to an embodiment, the processor 120 may perform a video service with an improved quality corresponding to the at least one quality improvement function.

Figure 8:
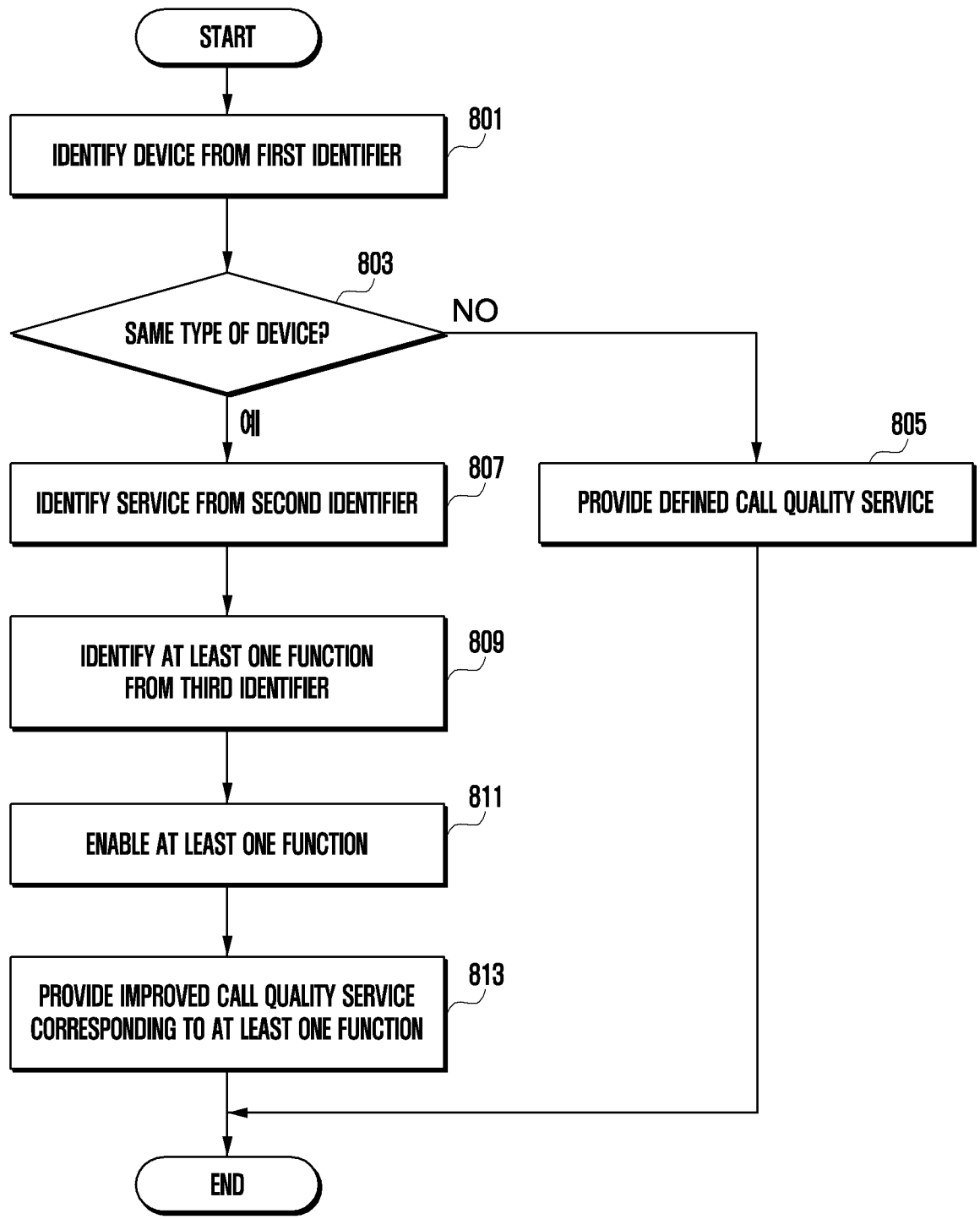
FIG. 8 is a flowchart illustrating an operation method of an electronic device according to various embodiments.

FIG. 8 is a flowchart illustrating an operation method of an electronic device according to various embodiments.

Referring to FIG. 8, in operation 801, the processor 120 according to various embodiments may identify a device from a first identifier (e.g., the first identifier 510 or the second identifier 520 in FIG. 5B) in a message (e.g., CNAME) of a received RTCP SDES packet. According to an embodiment, the processor 120 may identify a format of the first identifier for a string-based message of CNAME.

According to various embodiments, in operation 803, the processor 120 may determine whether the counterpart electronic device is a device of the same type as the electronic device 101, on the basis of device identification. According to an embodiment, the processor 120 may determine whether the format of the first identifier has an arranged identifier (e.g., an identifier indicating the same vendor as that of the electronic device 101) format.

According to various embodiments, if it is determined, in operation 803, that the counterpart electronic device is not of the same type (e.g., determined to be an electronic device from a different vendor) ("No" in operation 803), the processor 120 may provide a defined call quality service in operation 805. According to an embodiment, the processor 120 may transmit a packet (e.g., media data), to which a call quality improvement function has not been applied, to the counterpart electronic device.

According to various embodiments, if the counterpart electronic device is determined, in operation 803, to be an electronic device of the same type (e.g., determined to be an electronic device from the same vendor) ("Yes" in operation 803), the processor 120 may identify the service, in operation 807, on the basis of a second identifier (e.g., the third identifier 530 of FIG. 5B) in the message. According to an embodiment, the processor 120 may determine whether the format of the second identifier is a format indicating that the service is an IMS-based video service and is related to a quality service (QoS). According to an embodiment, the processor 120 may identify whether the second identifier has a format indicating a corresponding service, such as "imsq". According to an embodiment, if the second identifier is not of a designated format, the processor 120 may transmit a packet, to which the call quality improvement function has not been applied, as in an example of operation 805.

According to various embodiments, in operation 809, the processor 120 may identify at least one function from a third identifier (e.g., the fourth identifier 540 of FIG. 5B) in the message. According to an embodiment, the processor 120 may determine, from the third identifier, at least one quality improvement function that the counterpart electronic device supports as a quality improvement function in the IMS-based video service. According to an embodiment, the third identifier may include at least one of quality improvement functions (e.g., a first function (e.g., PLI, specific value=1), a second function (e.g., generic NACK, specific value=2), a third function (e.g., FLI, specific value=3), or a fourth function (e.g., TMMBR, specific value=4) defined in AVPF, and the processor 120 may identify a quality improvement function supported by the counterpart electronic device, from the third identifier.

According to various embodiments, in operation 811, the processor 120 may enable at least one function. According to various embodiments, the processor 120 may enable at least one matching quality improvement function by comparing a quality improvement function of the electronic device 101 with a quality improvement function of the identified counterpart electronic device.

According to various embodiments, in operation 813, the processor 120 may provide a call quality service with an improved quality according to at least one enabled quality improvement function. According to an embodiment, the processor 120 may transmit a packet (e.g., media data), to which the call quality improvement function has been applied, to the counterpart electronic device. According to an embodiment, the processor 120 may perform a video service with an improved quality corresponding to the at least one quality improvement function.

Figure 9:
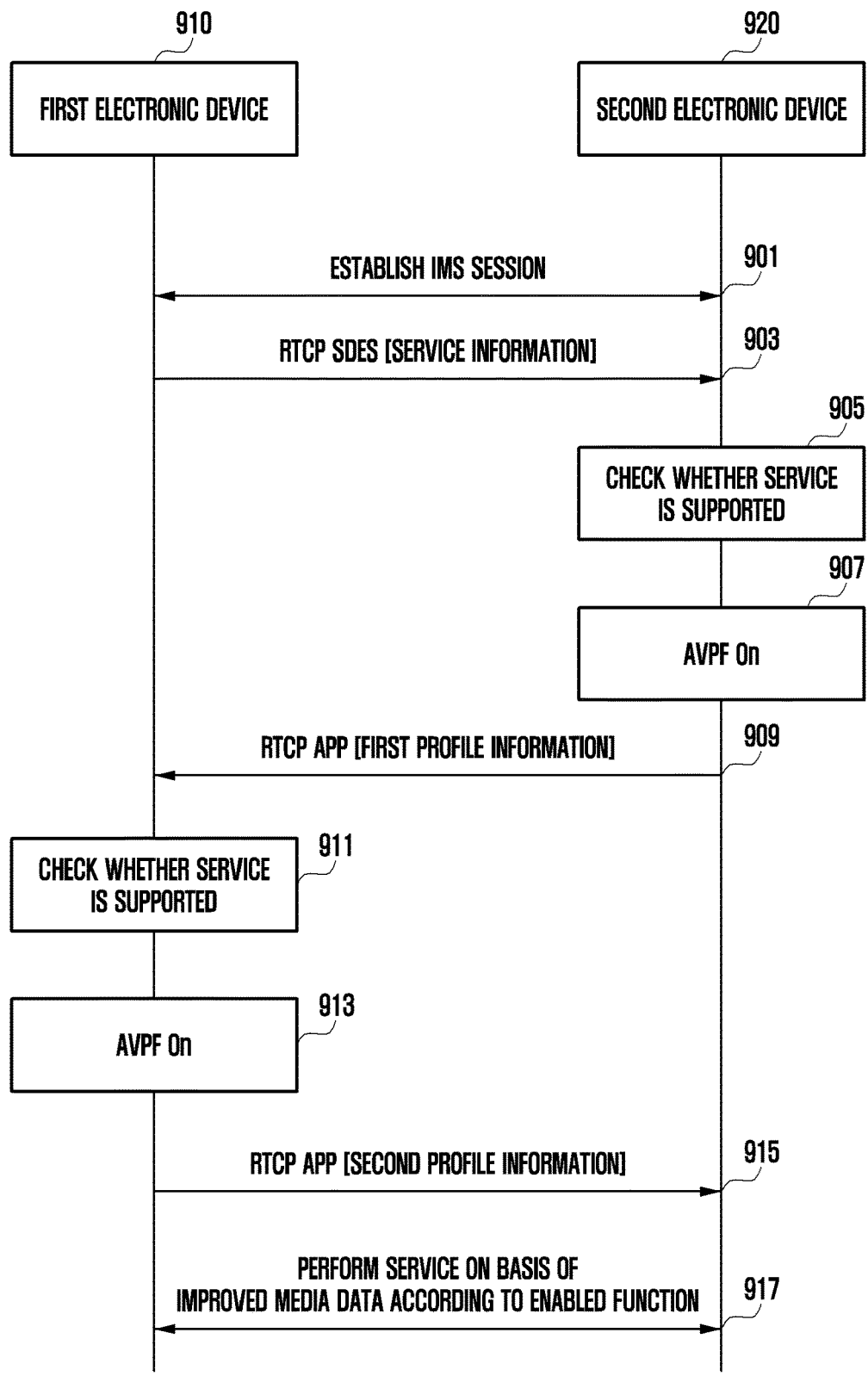
FIG. 9 is a diagram illustrating operations between electronic devices according to various embodiments.

FIG. 9 is a diagram illustrating operations between electronic devices according to various embodiments.

As shown in FIG. 9, FIG. 9 is a diagram describing a method of supporting a multimedia service (e.g., an IMS-based video call service) by quality improvement between electronic devices. According to an embodiment, FIG. 9 may show an example in which a first electronic device 910 and a second electronic device 920 negotiate AVPF to be off, in a negotiation procedure for session establishment. In various embodiments, each of the first electronic device 910 and the second electronic device 920 may be either the same type of device as the electronic device 101 of FIG. 1 or a different type of device from the electronic device 101 of FIG. 1, and may include all or some of the elements of the electronic device 101 of FIG. 1. According to various embodiments, operations of FIG. 9 may be operations generated by processors (e.g., the processor 120 of FIG. 1) of the first electronic device 910 and the second electronic device 920.

Referring to FIG. 9, in operation 901, the first electronic device 910 and the second electronic device 920 according to various embodiments may establish an IMS session. According to an embodiment, the first electronic device 910 and the second electronic device 920 may perform a negotiation procedure on the basis of SIP for an IMS-based voice call and may establish the session according to the negotiation procedure.

According to various embodiments, in operation 903, the first electronic device 910 may transmit, to the second electronic device 920, an RTCP SDES packet (e.g., media data) including, in CNAME, a message indicating service information of various embodiments. According to an embodiment, the message is included in the RTCP SDES packet, and after negotiation with the second electronic device 920 is completed, the first electronic device 910 may include, in CNAME of the RTCP SDES packet, string-based service information (or message) indicating that the electronic device 910 supports a function for quality improvement, and may transmit the RTCP SDES packet.

According to various embodiments, in operation 905, the second electronic device 920 may determine that the first electronic device 910 is a device available for a service, to which a quality improvement function has been applied, on the basis of the service information (or message) of the RTCP SDES packet received from the first electronic device 910.

According to various embodiments, in operation 907, if the first electronic device 910 is determined to be a service-available device, the second electronic device 920 may turn on AVPF. According to an embodiment, the second electronic device 920 may activate AVPF, and may enable at least one quality improvement function supported by the second electronic device 920 from among quality improvement functions of AVPF.

According to various embodiments, in operation 909, the second electronic device 920 may transmit, to the first electronic device 910, an RTCP APP packet including profile information (hereinafter, referred to as "first profile information") related to the enabled quality improvement function. According to an embodiment, RTCP packet types may include, for example, a sender report (SR), a receiver report (RR), SDES for CNAME, BYE, an APP packet, and the like. In various embodiments, the SDES packet and APP packet capable of inputting a string of a specific format from among these RTCP packets may be used for a negotiation procedure related to the quality improvement function. According to an embodiment, the SDES packet may be used, for example, as an INVITE message for requesting the service based on the quality improvement function from a counterpart electronic device, and the APP packet may be used to function as a 200 OK message or ACK message that responds to the INVITE message. In various embodiments, an engine version of the electronic device 101 and profile information relating to an available quality improvement function may be included in the APP packet so as to be transmitted.

According to various embodiments, in operation 911, in response to reception of the RTCP APP packet from the second electronic device 920, on the basis of first profile information of the RTCP APP packet received from the second electronic device 920, the first electronic device 910 may determine that the second electronic device 920 is a device available for the service, to which the quality improvement function has been applied, and the quality improvement function supported by the second electronic device 920.

According to various embodiments, in operation 913, if the second electronic device 920 is determined to be a service-available device, the first electronic device 910 may turn on AVPF. According to an embodiment, the first electronic device 910 may activate AVPF, and may enable at least one quality improvement function supported by the first electronic device 910 from among quality improvement functions of AVPF. According to an embodiment, the first electronic device 910 may enable at least one quality improvement function matching the quality improvement function supported by the second electronic device 920, on the basis of the first profile information.

According to various embodiments, in operation 915, the first electronic device 910 may transmit, to the second electronic device 920, an RTCP APP packet including profile information (hereinafter, referred to as "second profile information") related to the enabled quality improvement function. According to various embodiments, the first electronic device 910 may transmit the RTCP APP packet including an engine version of the first electronic device 910 and profile information relating to an available quality improvement function.

According to various embodiments, in operation 917, the first electronic device 910 and the second electronic device 920 may perform a service on the basis of media data improved according to a quality improvement function that is common (or matching) between each other. According to an embodiment, the first electronic device 910 and the second electronic device 920 may enable at least one common quality improvement function at an engine level, and may perform the service with an improved quality corresponding to the enabled quality improvement function.

An operation method of an electronic device 101 according to various embodiments of the disclosure may include: establishing a session for a video service with a counterpart electronic device; after the session is established, including, in a packet, a first message related to the use of a quality service, and transmitting the packet to the counterpart electronic device; determining whether the counterpart electronic device is a device available for the quality service, on the basis of a second message in a packet received from the counterpart electronic device; if the counterpart electronic device is a device available for the quality service, enabling at least one quality improvement function on the basis of the second message; and while the video service is being performed, transmitting, to the counterpart electronic device, a packet having improved quality on the basis of the quality improvement function.

According to various embodiments, the session for the video service may include a state in which audio-visual profile feedback (AVPF) is negotiated to be off and the quality service is thus unavailable.

According to various embodiments, the first message or the second message may include a string-based message included in a real-time transport control protocol (RTCP) source description (SDES) packet.

According to various embodiments, the string-based message may be configured for a canonical name (CNAME) of the RTCP SDES packet.

According to various embodiments, the string-based message may be configured in a string format including a first identifier for identifying an electronic device or a vendor of the electronic device, a second identifier for identifying a service type, and a third identifier for identifying a quality improvement function for the quality service.

According to various embodiments, the first identifier may include a form of a syntax enabling identification of the electronic device or a vendor of the electronic device, the second identifier may include a form of at least one character indicating that a service to be provided relates to a quality service (QoS) in the video service, and the third identifier may include a form of a specific value corresponding to at least one function supported as a quality improvement function by the electronic device in the video service.

According to various embodiments, the third identifier may include at least one specific value corresponding to a quality improvement function supported by the electronic device from among quality improvement functions of PLI, generic NACK, FLI, or TMMBR, which are defined in AVPF.

According to various embodiments, the determination of whether the counterpart electronic device is a device available for the quality service may include: after the session is established, determining whether the counterpart electronic device is a device available for the service based on the quality improvement function, at least on the basis of the first or second identifier; and determining a quality improvement function supported by the counterpart electronic device, at least on the basis of the third identifier.

According to various embodiments, the enabling of at least one quality improvement function may include: if the counterpart electronic device is a device available for the service, enabling a quality improvement function matching the counterpart electronic device, by referring to the third identifier.

According to various embodiments, the first message or the second message may further include a string-based message included in an RTP extension or an RTCP application (APP) packet.

The various embodiments of the disclosure, which are disclosed in the specification and the drawings, have been presented to easily explain the technical contents of the disclosure and to help understanding the disclosure, and are not intended to limit the scope of the disclosure. Therefore, the scope of the disclosure should be interpreted to include all modifications or modified forms derived based on the technical spirit of the disclosure, in addition to the embodiments disclosed herein.

The invention claimed is:

1. An electronic device comprising:
a wireless communication module;
a processor operatively connected to the wireless communication module; and
a memory operatively connected to the processor, wherein the memory stores instructions causing, when executed, the processor to:
perform a negotiation procedure for session establishment for a multimedia service in audio-visual profile with feedback (AVPF)-off with a counterpart electronic device by using the wireless communication module,
when the negotiation procedure is performed with AVPF-off, after the session is established, include, in a first packet, a string-based first message indicating a quality improvement function supported by the electronic device, and transmit the first packet to the counterpart electronic device, the first packet being continuously transmitted while the multimedia service is being performed,
receive a second packet including a string-based second message indicating a quality improvement function supported by the counterpart electronic device,
analyze an identifier of the second message by parsing the second message of the received second packet,
if the identifier of the second message belongs to a recognizable identifier, determine that the counterpart electronic device is a device available for the multimedia service based on the quality improvement function,
compare first function information of the first message with second function information of the second message based on the identifier,
enable at least one quality improvement function supported concurrently between the electronic devices regardless of the negotiation by AVPF-off, and
while the multimedia service is being performed, transmit a packet having an improved quality to the counterpart electronic device on the basis of the quality improvement function.

2. The electronic device of claim 1, wherein the first message or the second message comprises a string-based message included in a real-time transport control protocol (RTCP) source description packet (SDES) packet, and the string-based message is configured for a canonical name (CNAME) of the RTCP SDES packet.

3. The electronic device of claim 2, wherein the string-based message is configured in a string format comprising:
a first identifier configured to identify the electronic device or a vendor of the electronic device;
a second identifier configured to identify a service type; and
a third identifier configured to identify a quality improvement function for the multimedia service.

4. The electronic device of claim 3, wherein:
the first identifier comprises a syntax format that enables identification of the vendor of the electronic devices;
the second identifier comprises at least one character format indicating that a service to be provided relates to a quality service (QoS) in the multimedia service; and
the third identifier comprises a format of a specific value corresponding to at least one function that the electronic device supports as the quality improvement function in the multimedia service.

5. The electronic device of claim 3, wherein the third identifier comprises at least one specific value corresponding to a quality improvement function that the electronic device supports from among quality improvement functions of picture loss indication (PLI), generic negative acknowledgement (NACK), frame loss indication (FLI), or temporary maximum media stream bit rate request (TMMBR), which are defined in the AVPF.

6. The electronic device of claim 3, wherein the instructions cause the processor to:
after the session is established, determine whether the counterpart electronic device is a device available for the multimedia service applied the quality improvement function, at least on the basis of the first identifier or the second identifier; and
determine at least one quality improvement function supported concurrently between the electronic devices, at least on the basis of the third identifier.

7. The electronic device of claim 3, wherein the instructions cause the processor to, if the counterpart electronic device is a device available for the multimedia service applied the quality improvement function, enable at least one quality improvement function matching the counterpart electronic device, by referring to the third identifier.

8. The electronic device of claim 1, wherein the first message or the second message comprises a string-based message included in an RTCP application (APP) packet or RTP Extension.

9. An operation method of an electronic device, the method comprising:
- performing a negotiation procedure for session establishment for a multimedia service in audio-visual profile with feedback (AVPF)-off with a counterpart electronic device;
- when the negotiation procedure is performed with AVPF-off, after the session is established, including, in a first packet, a string-based first message indicating a quality improvement function supported by the electronic device, and transmitting the first packet to the counterpart electronic device, the first packet being continuously transmitted while the multimedia service is being performed;
- receiving a second packet includes a string-based second message indicating a quality improvement function supported by the counterpart electronic device;
- analyzing each identifier of the second message by parsing the second message of the received second packet;
- if the identifier of the second message belongs to a recognizable identifier, determining that the counterpart electronic device is a device available for the multimedia service applied the quality improvement function;
- comparing first function information of the first message with second function information of the second message based on the identifier;
- enabling at least one quality improvement function supported concurrently between the electronic devices regardless of the negotiation by AVPF-off; and while the multimedia service is being performed, transmitting a packet having an improved quality to the counterpart electronic device on the basis of the quality improvement function.

10. The method of claim 9, wherein the first message or the second message comprises a string-based message included in a real-time transport control protocol (RTCP) source description packet (SDES) packet, and the string-based message is configured for a canonical name (CNAME) of the RTCP SDES packet.

11. The method of claim 10, wherein the string-based message is configured in a string format comprising:
- a first identifier configured to identify the electronic device or a vendor of the electronic device;
- a second identifier configured to identify a service type; and
- a third identifier configured to identify a quality improvement function for the multimedia service.

12. The method of claim 11, wherein the enabling of at least one quality improvement function comprises:
- after the session is established, determining whether the counterpart electronic device is a device available for the multimedia service applied the quality improvement function, at least on the basis of the first identifier or the second identifier;
- if the counterpart electronic device is a device available for the multimedia service applied the quality improvement function, determining at least one quality improvement function supported concurrently between the electronic devices, at least on the basis of the third identifier; and
- enabling at least one quality improvement function matching the quality improvement function supported by the counterpart electronic device.

13. The method of claim 9, wherein the first message or the second message further comprises a string-based message included in an RTCP application (APP) packet or RTP Extension.

* * * * *